(12) United States Patent
Cagno

(10) Patent No.: US 7,986,621 B2
(45) Date of Patent: Jul. 26, 2011

(54) APPARATUS AND METHOD TO SET THE SIGNALING RATE FOR A PLURALITY OF DATA STORAGE DEVICES

(75) Inventor: Brian James Cagno, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1048 days.

(21) Appl. No.: 11/776,450

(22) Filed: Jul. 11, 2007

(65) Prior Publication Data

US 2008/0016309 A1 Jan. 17, 2008

Related U.S. Application Data

(63) Continuation-in-part of application No. 10/995,459, filed on Nov. 22, 2004, now Pat. No. 7,535,832.

(51) Int. Cl.
*H04J 1/16* (2006.01)

(52) U.S. Cl. .................. 370/229; 370/252; 370/465

(58) Field of Classification Search .................. 370/216, 370/241, 311, 252, 229, 465; 713/300, 310, 713/321, 324, 340; 714/24, 22

See application file for complete search history.

(56) References Cited

U.S. PATENT DOCUMENTS

| 3,735,396 | A | * | 5/1973 | Getchell ................. 340/505 |
| 4,328,543 | A | | 5/1982 | Brickman et al. |
| 4,866,667 | A | | 9/1989 | Shimada |
| 5,751,796 | A | * | 5/1998 | Scott et al. ............... 379/93.31 |
| 5,778,242 | A | | 7/1998 | Wang |
| 6,140,926 | A | * | 10/2000 | Hayden et al. ........... 340/635 |
| 6,721,317 | B2 | | 4/2004 | Chong, Jr. |
| 6,763,417 | B2 | | 7/2004 | Paul et al. |
| 7,028,134 | B2 | | 4/2006 | Wang et al. |
| 2006/0050731 | A1 | | 3/2006 | Thomas |
| 2006/0112249 | A1 | | 5/2006 | Bomhoff et al. |

* cited by examiner

*Primary Examiner* — Huy D Vu
*Assistant Examiner* — Dady Chery
(74) *Attorney, Agent, or Firm* — Dale F. Regelman; Quarles & Brady LLP

(57) ABSTRACT

A signaling speed module wherein that signaling speed module sets the signaling rate for each of a plurality of data storage devices. In certain embodiments of the invention, the signaling speed module comprises a memory device encoded with a pre-determined signaling rate. In other embodiments of the invention, the signaling speed module comprises a speed selection module, wherein that speed selection module sets the signaling rate for each of a plurality of data storage devices.

17 Claims, 16 Drawing Sheets

FIG. 9

| DEV_CTRL (2:0) | DESCRIPTION |
|---|---|
| '111' | 1.0625 GHz - THE FC INTERFACES FOR BOTH PORTS OF THE DRIVE ARE SET TO RUN AT A LINK RATE OF 1.0625 GHZ. |
| '110' | 2.1250 GHz - THE FC INTERFACES FOR BOTH PORTS OF THE DRIVE ARE SET TO RUN AT A LINK RATE OF 2.1250 GHZ. |
| '101' | 4.250 GHz - THE FC INTERFACES FOR BOTH PORTS OF THE DRIVE ARE SET TO RUN AT A LINK RATE OF 4.250 GHZ. |
| '100' | 8.500 GHz - THE FC INTERFACES FOR BOTH PORTS OF THE DRIVE ARE SET TO RUN AT A LINK RATE OF 8.500 GHZ. |
| '000' | POWER FAILURE WARNING |

APPARATUS AND METHOD TO SET THE SIGNALING RATE FOR A PLURALITY OF DATA STORAGE DEVICES

CROSS REFERENCE TO RELATED APPLICATIONS

This Application is a Continuation-In-Part of the application having Ser. No. 10/995,459 filed Nov. 22, 2004 now U.S. Pat. No. 7,535,832.

FIELD OF THE INVENTION

This invention relates to an apparatus and method to set the signaling rate of a plurality of data storage devices disposed within an information storage and retrieval system.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices. Upon receipt of a write request, the system stores information received from a host computer in a data cache. In some storage systems, a copy of that information is also stored in a nonvolatile storage device. Upon receipt of a read request, the system recalls information from the one or more data storage devices and moves that information to the data cache. Thus, the system is continuously moving information to and from a plurality of data storage devices, and to and from the data cache.

The plurality of data storage devices are often interconnected via a network. Upon system start-up, or upon a system reboot, it is often necessary to set a signaling rate for each of the plurality of data storage devices. Prior art methods for setting such a signaling rate often require a network disruption and/or sampling or resampling of individual device signaling rates.

SUMMARY OF THE INVENTION

The invention comprises a signaling speed module for use in a data storage and retrieval system comprising a plurality of data storage devices interconnected to a midplane. The signaling speed module plugs into the midplane, and sets the signaling rate for each of the plurality of data storage devices.

Use of the signaling speed module provides a low cost method to set, and to change, the signaling rate used by the data storage devices. Furthermore, use of the signaling speed modules provide "instant on" capability to set up the data storage devices on power on with no associated disruptions to resample speed settings. In addition, use of the signaling speed module provides an extremely low failure rate because the signaling speed module does not comprise a processor.

In certain embodiments of the invention, the signaling speed module comprises a memory device encoded with a pre-determined signaling rate, wherein that signaling rate is used by each of the plurality of data storage devices. In other embodiments of the invention, the signaling speed module comprises a speed selection module, wherein that speed selection module can receive a signal from a processor to change the signaling rate. In response to that signal, the signaling speed module changes the signaling rate used by the data storage devices interconnected with the midplane.

Use of the either embodiment of the signaling speed module supports future hardware developments. If the signaling rate capability of data storage devices increases, such enhanced capability can be implemented in the data storage and retrieval system by use of a plurality of new data storage devices and the existing signaling speed module if that module comprises a speed selection function. Alternatively, such enhanced capability can be implemented in the data storage and retrieval system by use of a plurality of new data storage devices and a single new signaling speed module.

BRIEF DESCRIPTION OF THE DRAWINGS

The invention will be better understood from a reading of the following detailed description taken in conjunction with the drawings in which like reference designators are used to designate like elements, and in which:

FIG. 9 is a table reciting settings for four sets of Device Control Code bits;

DETAILED DESCRIPTION OF THE PREFERRED EMBODIMENTS

Preferred embodiments of the invention are described in the following with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
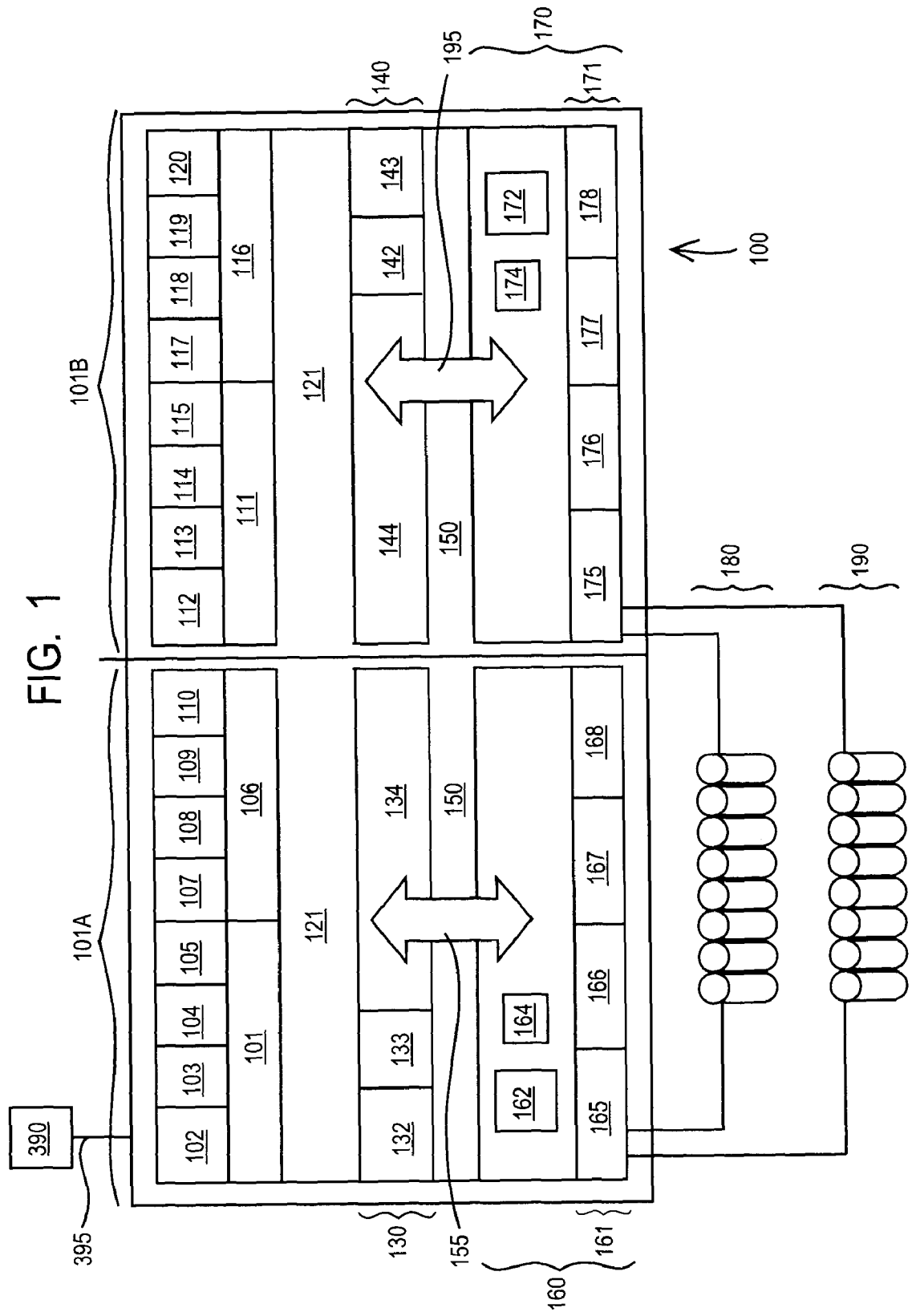
FIG. 1 is a block diagram showing a first embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group; LINUX is a registered trademark of Linus Torvald.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapters 101A which includes adapters 102-105 and 107-110; and a second plurality of host adapters 101B which includes adapters 112-115 and 117-120. In other embodiments, Applicants' information storage and retrieval system includes fewer than 16 host adapters. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprise nonvolatile storage ("NVS") 172 and battery backup 174 for NVS 172.

In certain embodiments of Applicants' system, one or more host adapters 101, processor portion 130, one or more device adapters 161, and a switch 207, are disposed in a controller, such as controller 205 (FIGS. 2, 3), disposed in Applicants' information storage and retrieval system. Similarly, in certain embodiments, one or more host adapters, a processor portion, one or more device adapters, and a switch, are disposed in a second controller, such as controller 205b (FIG. 3), disposed in Applicants' information storage and retrieval system. In these embodiments, Applicants' data storage and retrieval system comprises two controllers in communication with a plurality of data storage devices.

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
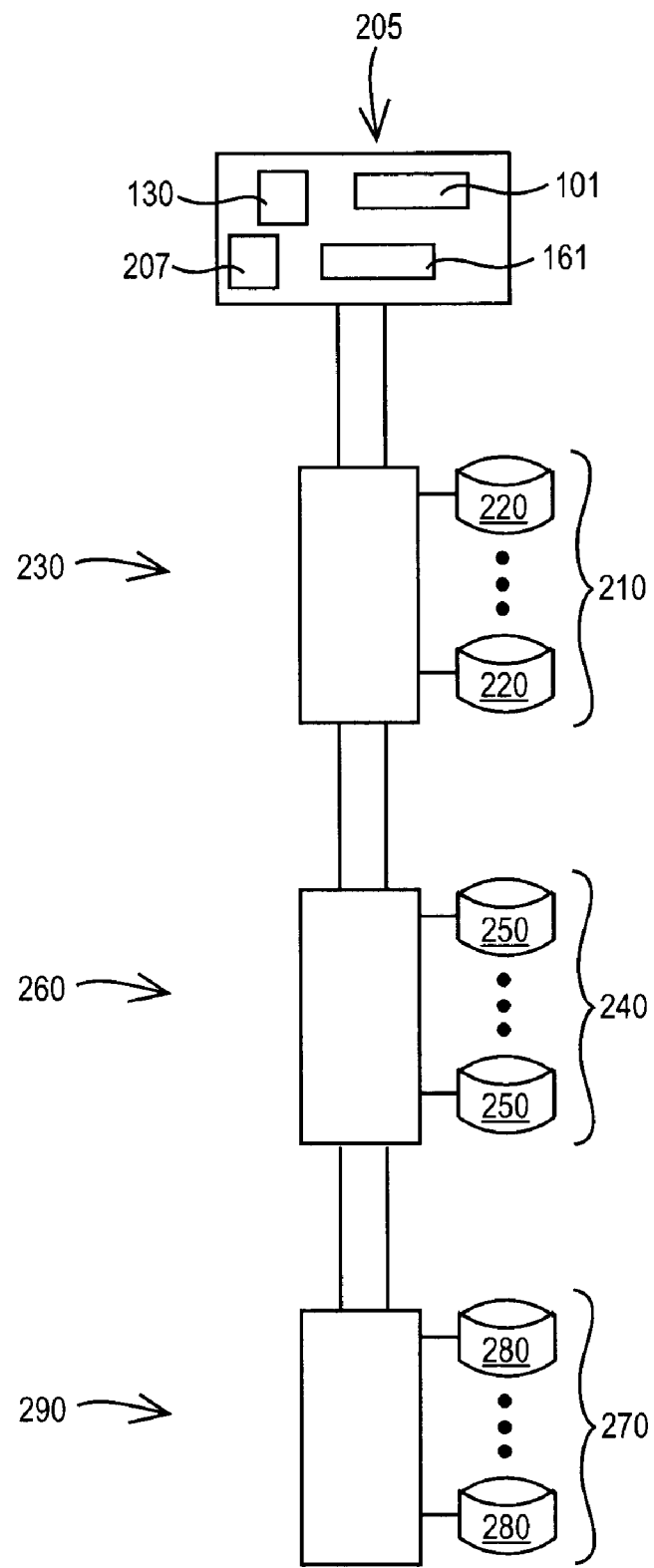
FIG. 2 is a block diagram showing a second embodiment of the data storage and retrieval system of FIG. 1 comprising three switch domains, each of which comprises one or more data storage devices.

Referring now to FIG. 2, a plurality of data storage devices 220, 250, and 280, are interconnected with system controller 205 using three switch domains. Those three switch domains include switch domain 210, switch domain 240, and switch domain 270. Each switch domain includes a switch and one or more data storage devices interconnected to that switch. Switch domain 210 comprises switch domain controller 230 and one or more data storage devices 220. Switch domain 240 comprises switch domain controller 260 and one or more data storage devices 250. Switch domain 270 comprises switch domain controller 290 and one or more data storage devices 280.

The loop structure shown in FIG. 2 comprises one embodiment of Applicant's system. In other embodiments, communication links shown in FIG. 2 comprise a switched fabric or a combination of a switch and loop topologies. In yet other embodiments and referring now to FIG. 3, Applicants' information storage and retrieval system comprises dual FC-AL loops of switches where the system controllers 205a and 205b are interconnected with two FC-AL loops. Each loop contains one or more switch domain controllers, such as switch domain controllers 310, 320, 330, 340, 350, and 360.

Each switch domain controller comprises a switch, a processor, and microcode. In certain embodiments, the switch comprises a Fibre Channel switch. In certain embodiments, the processor comprises an SES processor. For example, switch domain controllers 310, 320, 330, 340, 350, and 360, include processors 312, 322, 332, 342, 352, and 362, respectively. Similarly, switch domain controllers 310, 320, 330, 340, 350, and 360, include switches 314, 324, 334, 344, 354, and 364, respectively. In addition, switch domain controllers 310, 320, 330, 340, 350, and 360, include microcode 316, 326, 336, 346, 356, and 366, respectively.

Figure 3:
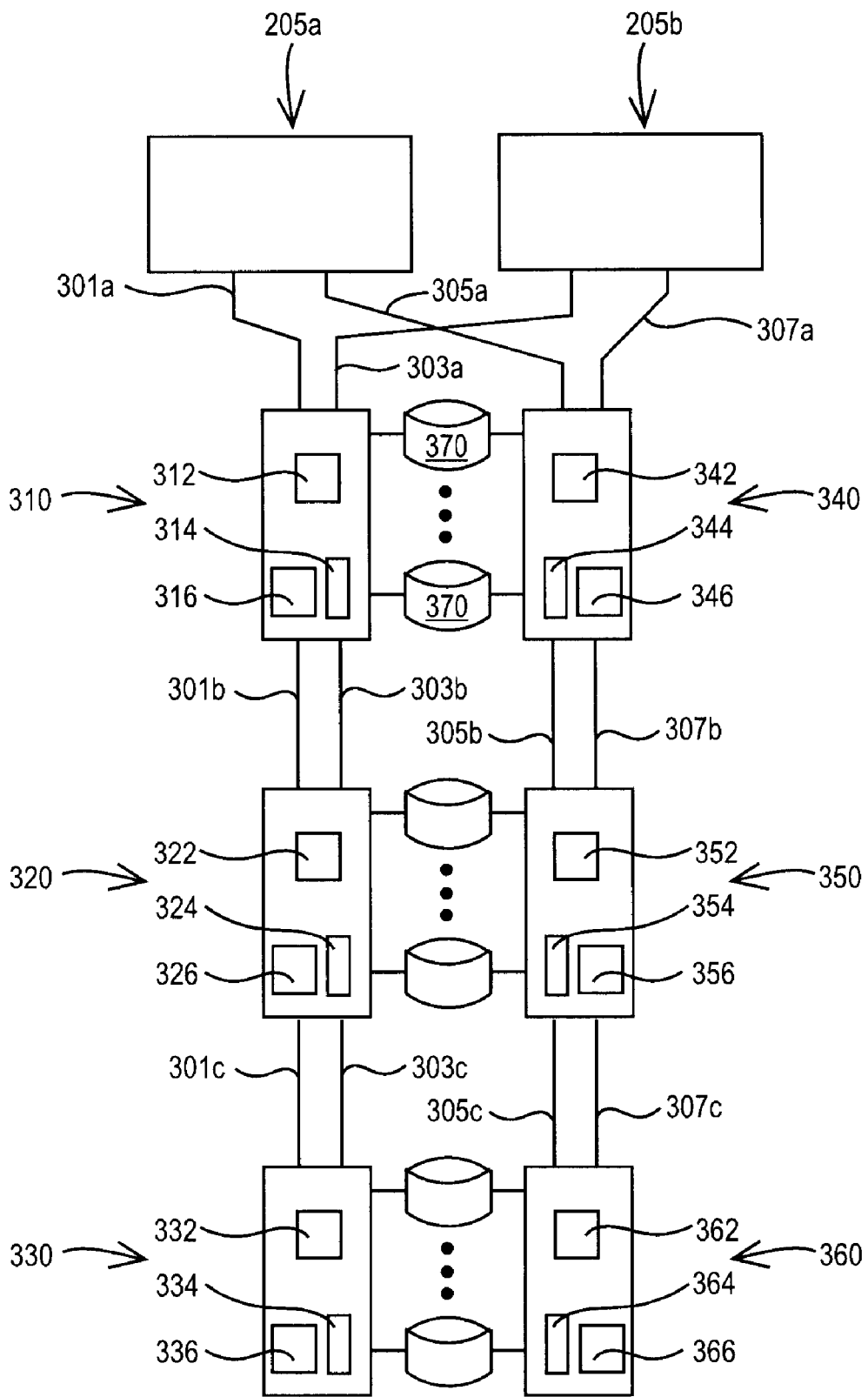
FIG. 3 is a block diagram showing a third embodiment of the data storage and retrieval system of FIG. 1 comprising six switch domains, each of which comprises one or more data storage devices.
Figure 4A:
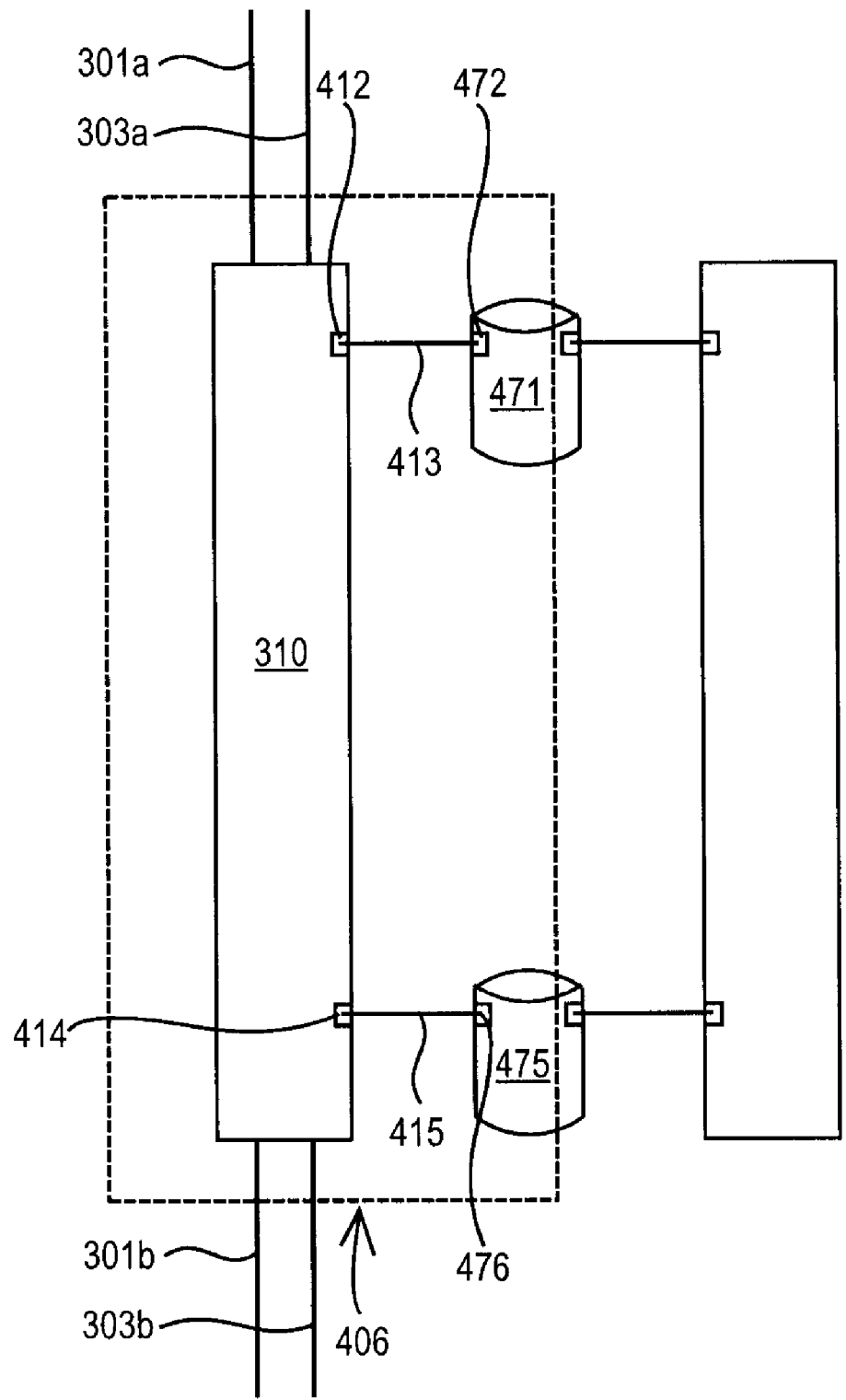
FIG. 4A is a block diagram showing a first switch domain in the data storage and retrieval system of FIG. 3.

The illustrated embodiment of FIG. 3 includes 6 switch domains. For example and referring to FIG. 4A, switch domain 406 includes switch domain controller 310 and data storage devices 471 and 475. Data storage devices 471 and 475 each comprise two I/O ports. Port 472 of data storage device 471 is interconnected with port 412 of switch domain controller 310 via communication link 413. Port 476 of data storage device 475 is interconnected with port 414 of switch domain controller 310 via communication link 415.

Figure 4B:
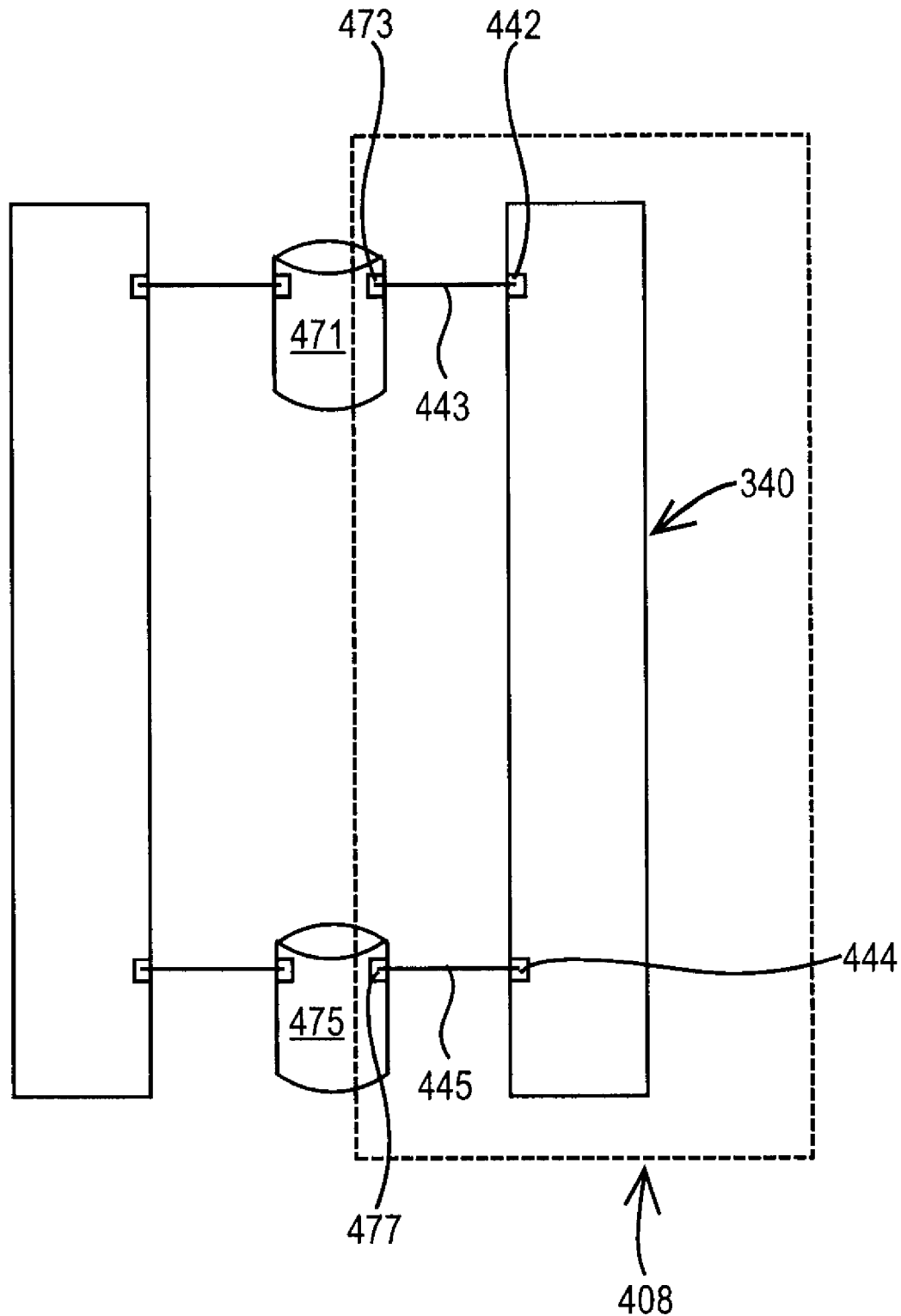
FIG. 4B is a block diagram showing a second switch domain in the data storage and retrieval system of FIG. 3.

Referring to FIG. 4B, switch domain 408 includes switch domain controller 340 and data storage devices 471 and 475. Data storage devices 471 and 475 each comprise two I/O ports. Port 473 of data storage device 471 is interconnected with port 442 of switch domain controller 340 via communication link 443. Port 477 of data storage device 475 is interconnected with port 444 of switch domain controller 340 via communication link 445.

In certain embodiments of Applicants' method, each of the two ports disposed on a data storage device must operate at the same signaling rate. For example, switch domain 406 may be capable of operating at a speed of about 4 gigabits per second. Switch domain 408 may be limited to an operating speed of about 2 gigabits per second if, for example, port 473 can support a 2 gigabit per second speed but not a 4 gigabit per second speed, even if all of the other components comprising switch domain 408 are capable of operating at about 4 gigabits per second. If switch domain 406 keeps data storage device 471 on-line and operates at 2 gigabits per second, and if switch domain 408 keeps data storage device 471 on-line, then both switch domains operate at a 2 gigabits per second signaling rate. Alternatively, if switch domain 406 takes data storage device 471 off-line, then both switch domains can operate at a 4 gigabit per second signaling rate.

Figure 5A:
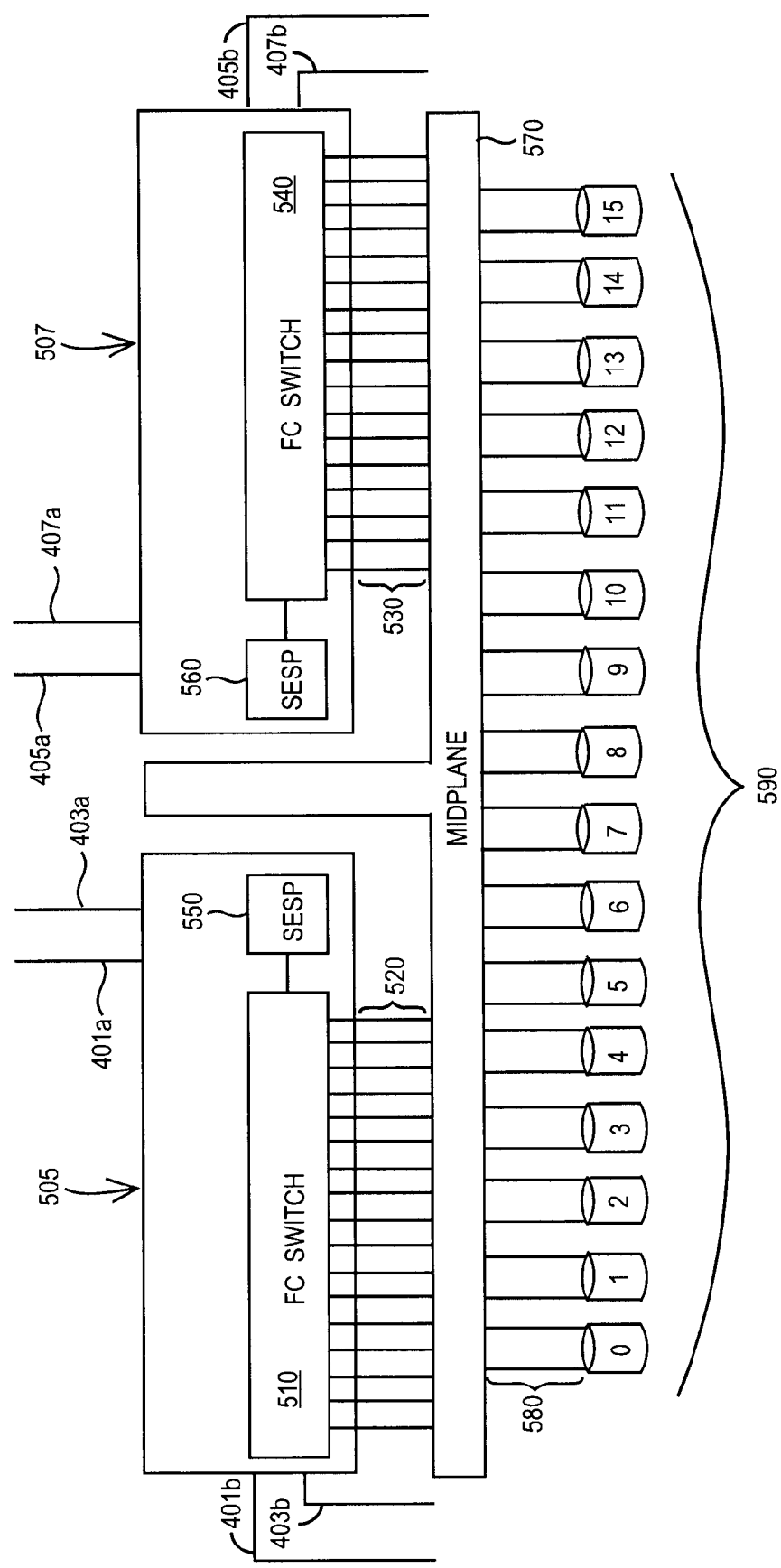
FIG. 5A is a block diagram showing a fourth embodiment of the data storage and retrieval system of FIG. 1.

In certain embodiments, Applicants' apparatus further includes a midplane interconnecting one or more controllers to one or more data storage devices. Referring now to FIG. 5A, controller 505 comprises Fibre Channel switch 510 and SES processor 550. A plurality of first communication links 520 interconnect Fibre Channel switch 510 to midplane 570. A plurality of second communication links 580 interconnect a plurality of data storage devices 590 with midplane 570.

Controller 507 comprises Fibre Channel switch 540 and SES processor 560. A plurality of first communication links 530 interconnect Fibre Channel switch 540 to midplane 570.

Figure 5B:
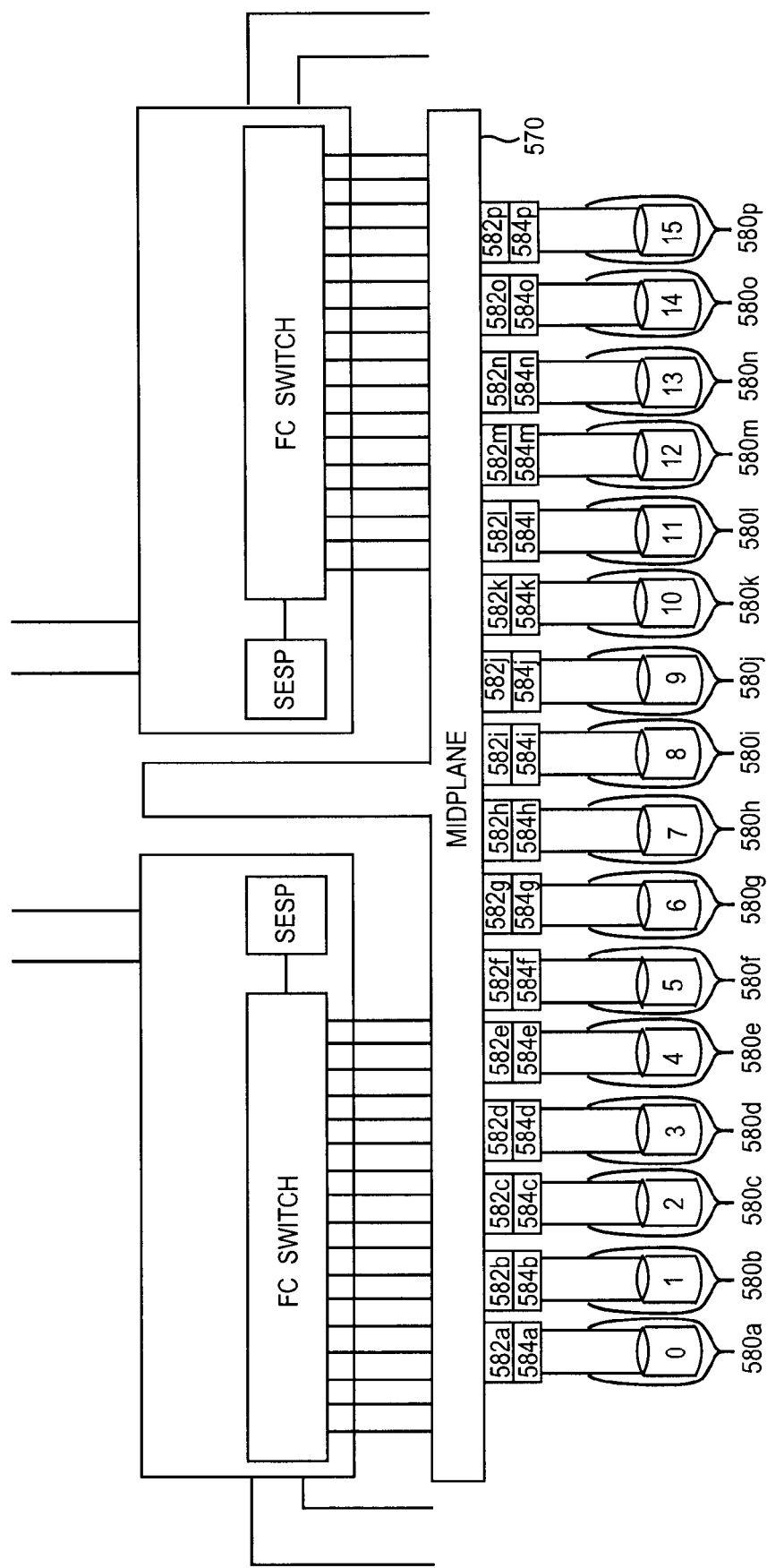
FIG. 5B is a block diagram showing SCA connectors and receptacles disposed on the midplane of FIG. 5A.

Referring now to FIGS. 5A and 5B, in certain embodiments of Applicants' data storage and retrieval system plurality of communication links 580 are interconnected with a plurality of Single Connector Assemblies ("SCA") 582. In certain embodiments, each SCA 582 comprises a 40 position SCA. In certain embodiments, each SCA 582 comprises an 80 position SCA. In the illustrated embodiment of FIG. 5B, data storage device 0 is interconnected with midplane 570 by plurality of communication links 580a. Plurality of communication links 580a are interconnected to SCA receptacle 584a. SCA 582a is attached to and in communication with midplane 570. SCA 582a mates with SCA receptacle 584a.

Similarly, data storage devices 1, 2, 3, 4, 5, 6, 7, 8, 9, 10, 11, 12, 13, 14, and 15, are interconnected with midplane 570 by plurality of communication links 580b, 580c, 580d, 580e, 580f, 580g, 580h, 580i, 580j, 580k, 580l, 580m, 580n, 580o and 580p, respectively. Plurality of communication links 580b, 580c, 580d, 580e, 580f, 580g, 580h, 580i, 580j, 580k, 580l, 580m, 580n, 580o and 580p are interconnected to SCA receptacles 584b, 584c, 584d, 584e, 584f, 584g, 584h, 584i, 584j, 584k, 584l, 584m, 584n, 584o and 584p, respectively. SCA 582b, 582c, 582d, 582e, 582f, 582g, 582h, 582i, 582j, 582k, 582l, 582m, 582n, 582o and 582p, respectively, are attached to and in communication with midplane 570. SCA 582b, 582c, 582d, 582e, 582f, 582g, 582h, 582i, 582j, 582k, 582l, 582m, 582n, 582o and 582p mate with SCA receptacles 584b, 584c, 584d, 584e, 584f, 584g, 584h, 584i, 584j, 584k, 584l, 584m, 584n, 584o and 584p, respectively.

Figure 6:
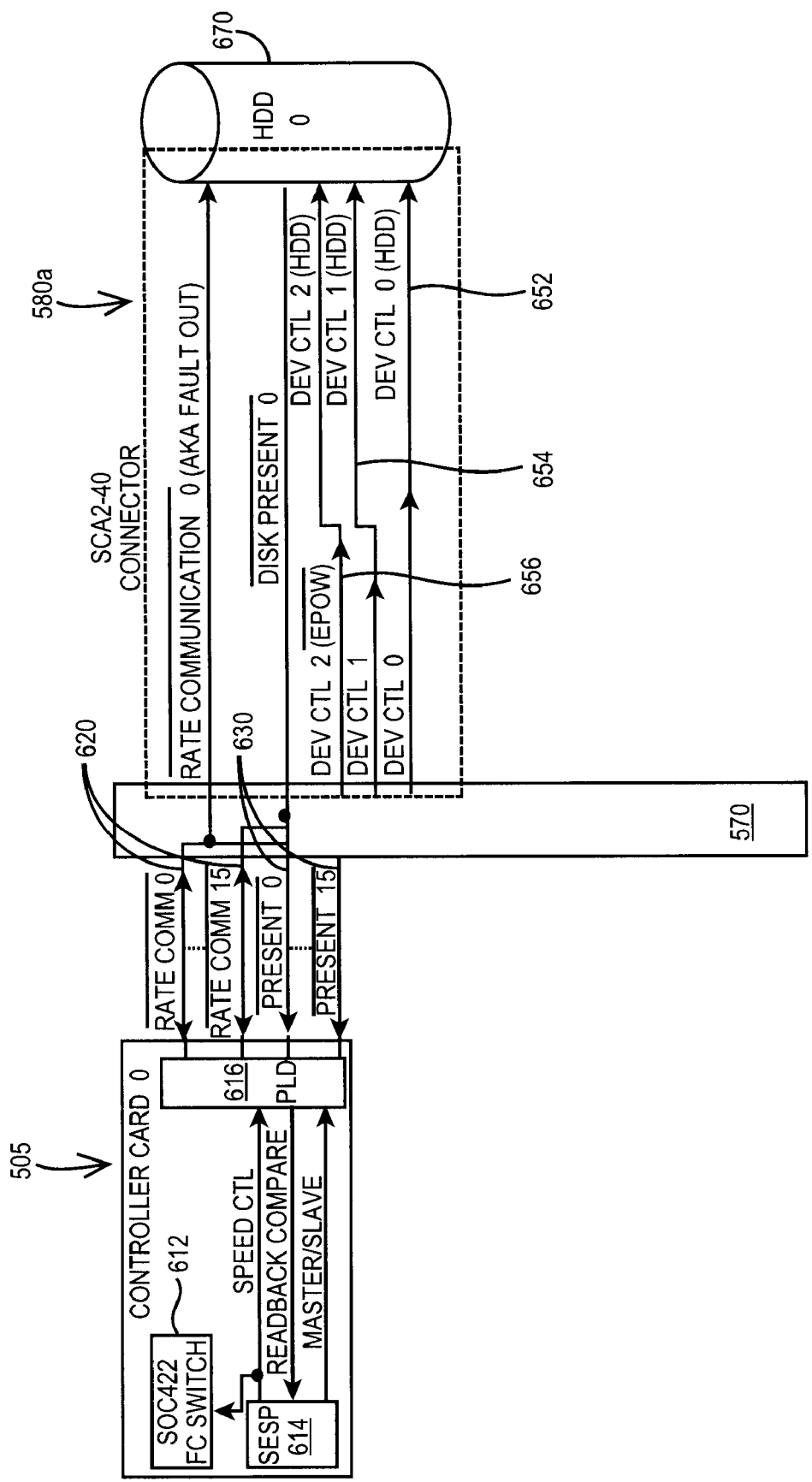
FIG. 6 is a block diagram showing certain communication links disposed in a portion of the system of FIG. 5A.

In the illustrated embodiment of FIG. 6, controller 505 comprises FC switch 612, SES processor 614 and programmable logic device ("PLD") 616. A plurality of rate communication lines 620, and a plurality of disk present lines 630, interconnected controller 505 and midplane 570. In certain embodiments, the plurality of communication links 520 recited in FIGS. 5A and 5C comprise rate comm lines 620 and disk present lines 630.

The illustrated embodiment of FIG. 6 shows data storage device 670, i.e. disk 0, interconnected with backplane 570 via plurality of communication links 580(a) comprising an SCA2-40 connector. Plurality of communication links 580(a) comprise communication links 652, 654, and 656. Communication links 652, 654, and 656 provide data storage device 670 with three control bits, namely dev_ctl0, dev_ctl1, and dev_ctl2. Disks 1 through 15 are separately interconnected with backplane 570 via individual SCA2-40 connectors, wherein, each of those SCA2-40 connectors comprises a set of communication links 652, 654, and 656, thereby providing each of the interconnected disks with control bits dev_ctl0, dev_ctl1, and dev_ctl2.

Figure 7A:
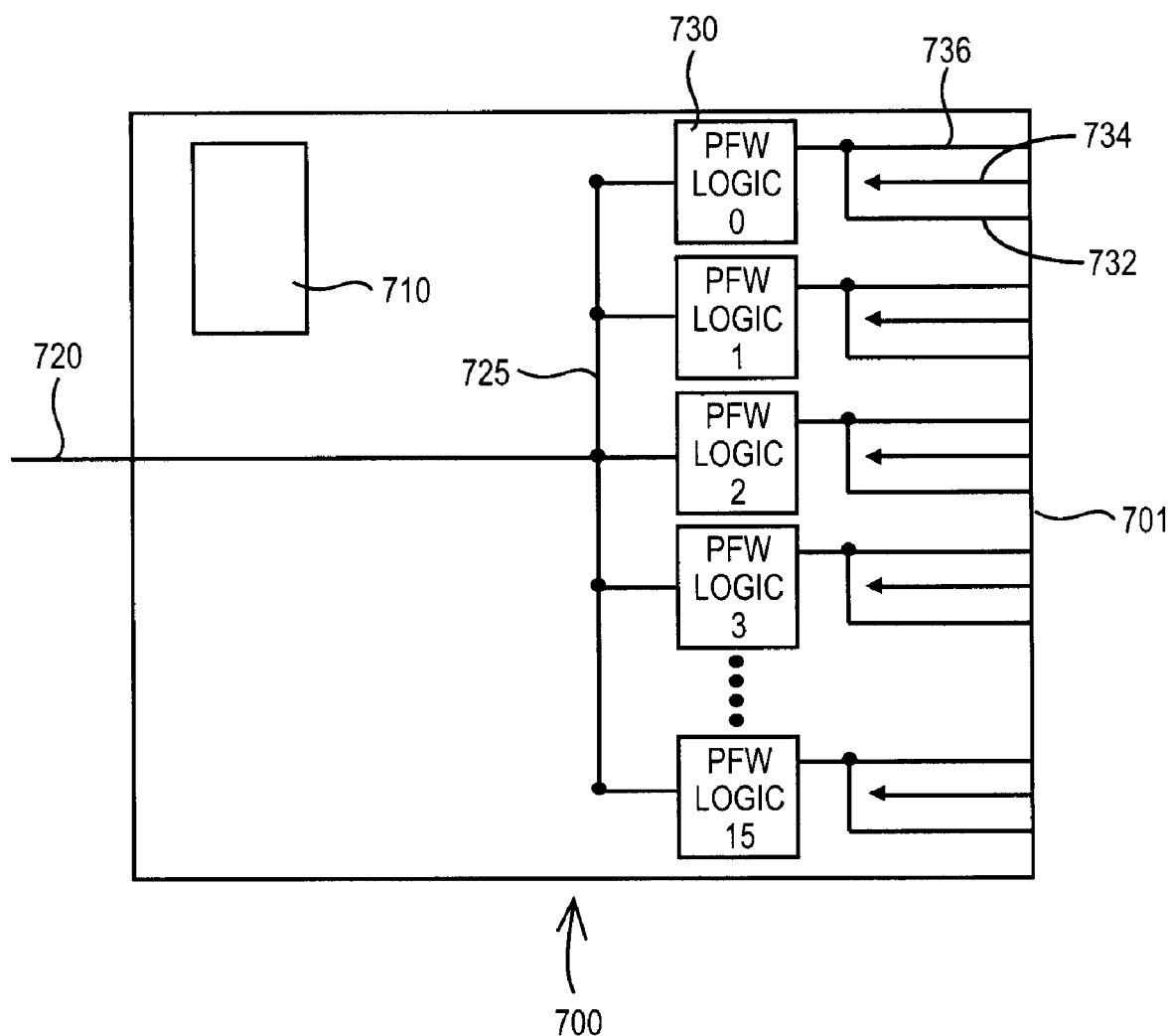
FIG. 7A is a block diagram showing one embodiment of Applicant's signaling speed module.

Applicant's apparatus further comprises a plug-in signaling speed module, wherein that signaling speed module can be releaseably attached to midplane 570. Referring now to FIG. 7A, signaling speed module 700 comprises a power failure warning ("PFW") module for each disk attached to the midplane. For example in the illustrated embodiment of FIG. 7, signaling speed module comprises a separate PFW logic module for each of disks 0 through 15, inclusive.

Signal input line 720 interconnects communication bus 725 with a power supply providing power to the disks interconnected with the midplane. Communication bus 725 is in communication with each PFW logic module disposed in signaling speed module 700. In the illustrated embodiment of FIG. 7, signaling speed module 700 further comprises memory device 710. In certain embodiments, memory device 710 comprises an EEPROM. Memory device 710 is encoded with, inter alia, a pre-determined signaling rate. Memory device 710 can be releaseably interconnected with an SES Processor disposed in a switch domain controller.

In certain embodiments of the invention, signaling speed module 700 is configured to support about a 1.0 GHz link rate. In certain of these embodiments, signaling speed module 700 is configured to support a nominal signaling rate of 1.0625 GHz. In certain embodiments of the invention, signaling speed module is configured to support about a 2.0 GHz link rate. In certain of these embodiments, signaling speed module 700 is configured to support a nominal signaling rate of 2.1250 GHz. In certain embodiments of the invention, signaling speed module 700 is configured to support about a 4.0 GHz link rate. In certain of these embodiments, signaling speed module 700 is configured to support a nominal signaling rate of 4.250 GHz. In certain embodiments of the invention, signaling speed module 700 is configured to support about an 8.0 GHz link rate. In certain of these embodiments, signaling speed module 700 is configured to support a nominal signaling rate of 8.500 GHz.

Figure 7B:
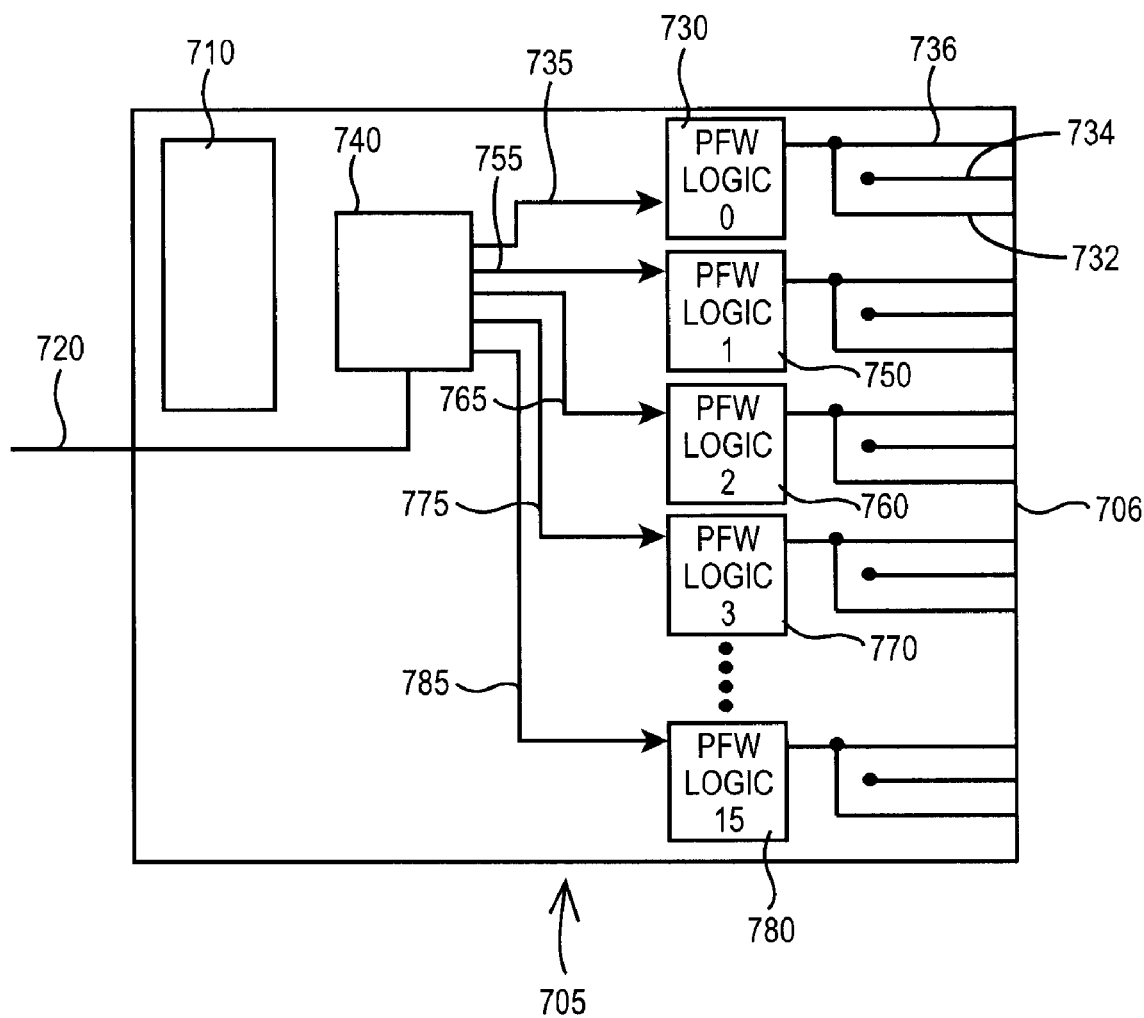
FIG. 7B is a block diagram showing a second embodiment of Applicant's signaling speed module.
Figure 7C:
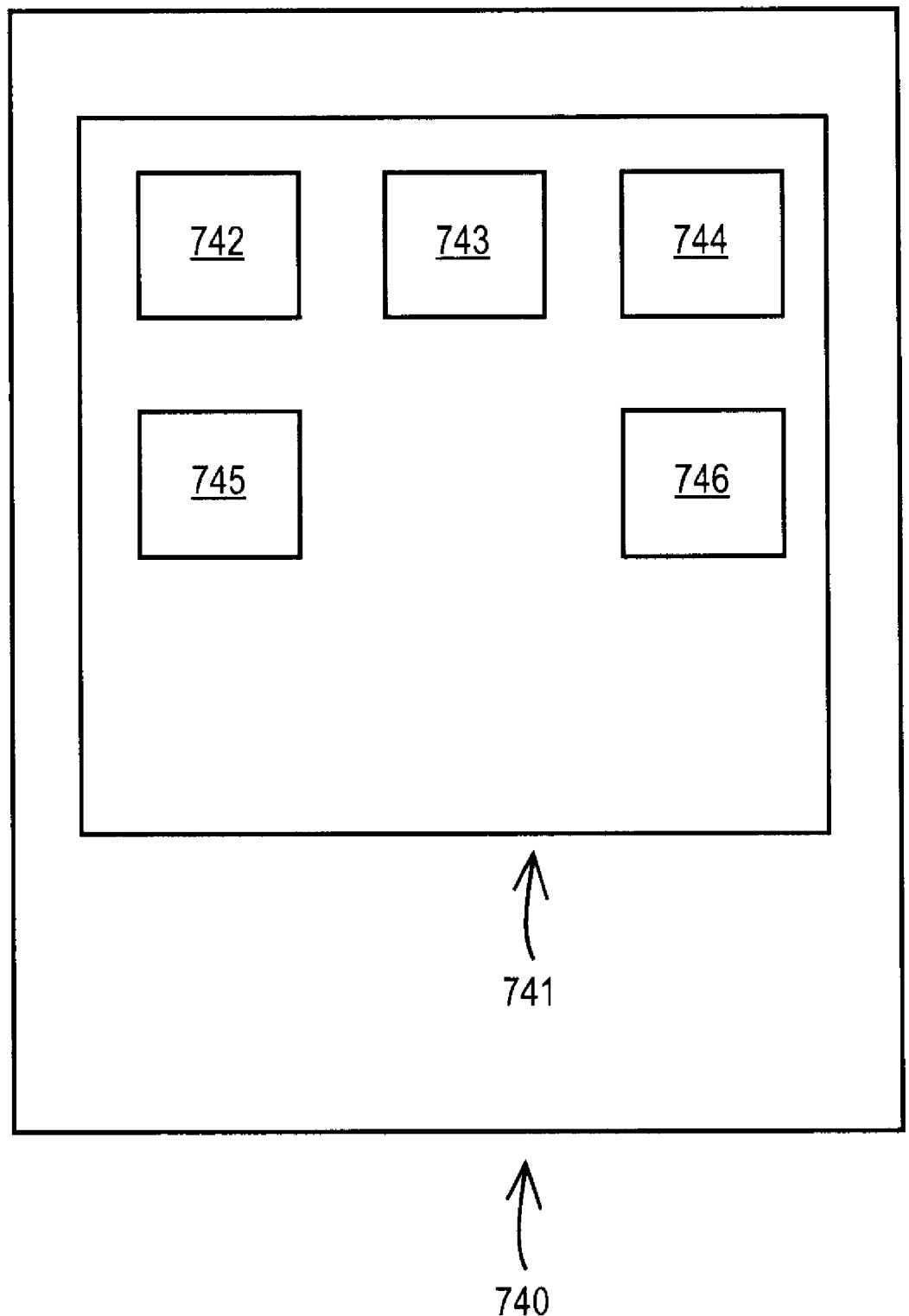
FIG. 7C is a block diagram showing the elements of Applicant's speed selection module.

Referring now to FIGS. 7B and 7C, signaling speed module 705 comprises the elements of signaling speed module 700 in combination with speed selection module 740. In certain embodiments, speed selection module 740 comprises a computer readable medium.

Speed selection module 740 is in communication with each PFW logic module. In certain embodiments, speed selection module 740 communicates with each PFW logic module using a separate communication link. For example in the illustrated embodiment of FIG. 7B, speed selection module 740 communicates with PFW logic module 730 via communication link 735. Similarly, speed selection module 740 communicates with PFW logic modules 750, 760, 770, and 780, via communication links 755, 765, 775, and 785, respectively.

Unlike signaling speed module 700, signaling speed module 705 is not configured to support a single, predetermined signaling rate. Rather, speed selection module 740 can communicate with a switch domain processor, such as for example SES Processor 614. Using signaling speed module 705, that interconnected switch domain processor can independently select the signaling rate for each disk disposed in the switch domain.

In the illustrated embodiment of FIG. 7C, speed selection module 740 comprises computer readable medium 741, and first program instructions 742 to generate a plurality of device control code bits for each of (N) data storage devices. First program instructions 742 are encoded in computer readable medium 741. In certain embodiments, first program instructions set a plurality of device control code bits to "111" to indicate use of a 1 Gb/second signaling rate, or set a plurality of device control code bits to "110" to indicate use of a 2 Gb/second signaling rate, or set a plurality of device control code bits to "101" to indicate use of a 4 Gb/second signaling rate, or set a plurality of device control code bits to "100" to indicate use of an 8 Gb/second signaling rate.

Figure 8A:
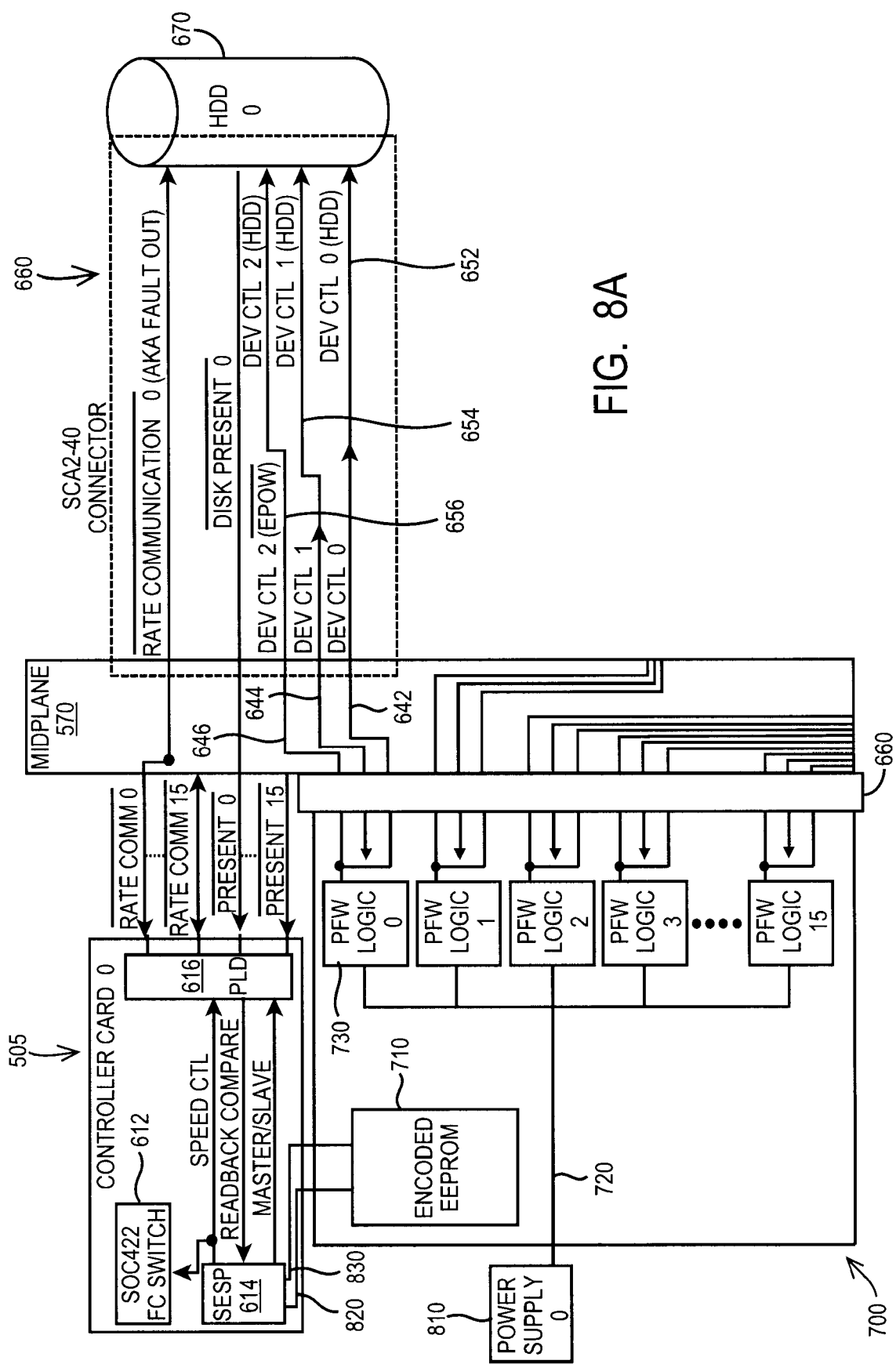
FIG. 8A is a block diagram showing the signaling speed module of FIG. 7A releaseably attached to the apparatus of FIG. 6.
Figure 8B:
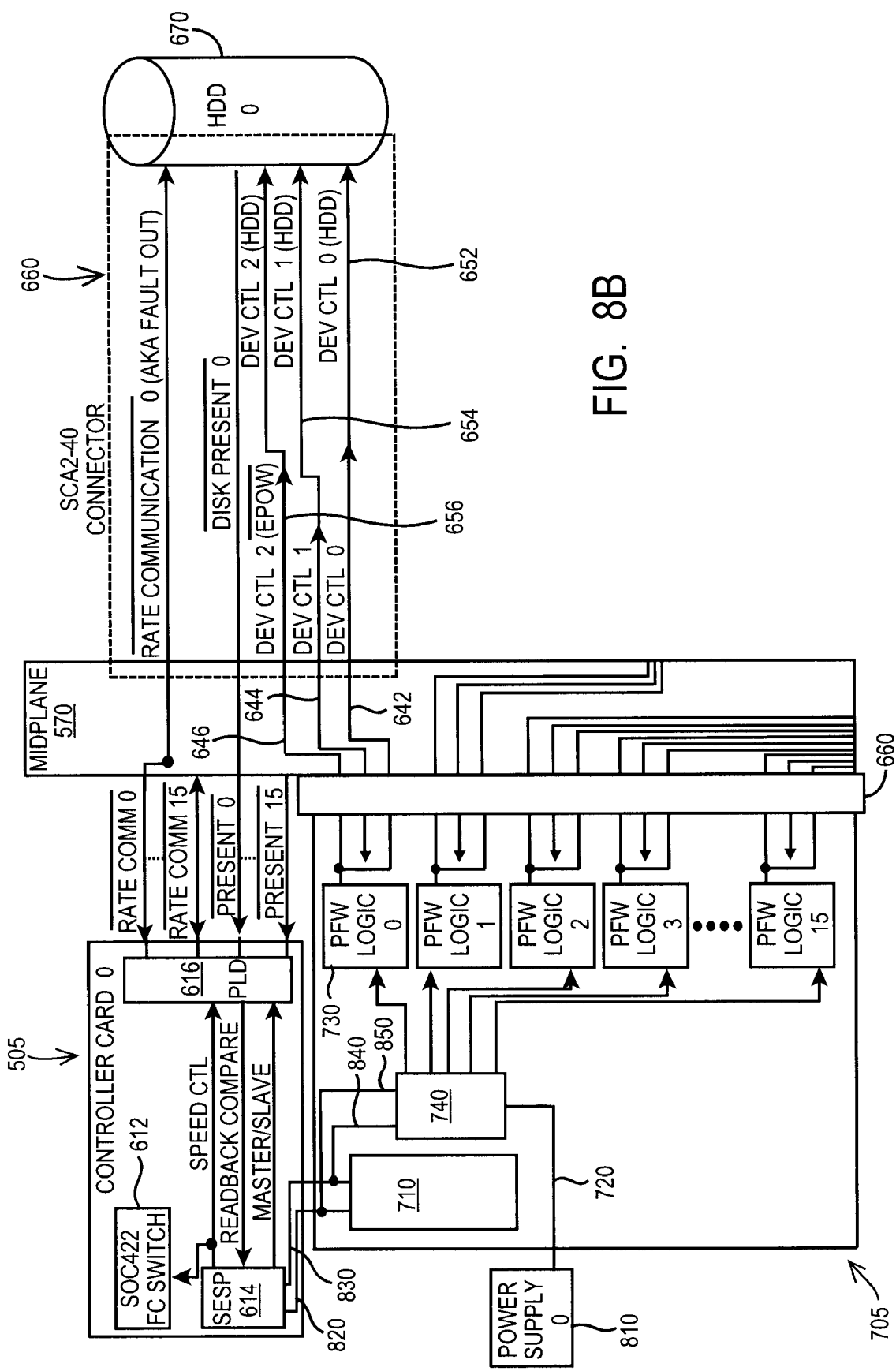
FIG. 8B is a block diagram showing the signaling speed module of FIG. 7B releaseably attached to the apparatus of FIG. 6.

Referring now to FIGS. 7B, 7C, and 8B, speed selection module 740 further comprises second program instructions 743, and third program instructions 744, encoded in computer readable medium 741. In the event of an imminent power failure, second program instructions 743 receive an Early Power Warning signal from power supply 810 via communication link 720. In response to that Early Power Warning signal, third program instructions 744 generate a plurality of revised device control code bits, and provide that plurality of revised device control code bits to each of the PFW modules disposed in the signaling speed module. In certain embodiments, the third program instructions 744 set the plurality of revised device control code bits to "000".

In the illustrated embodiment of FIG. 7C, speed selection module further comprises fourth program instructions 745, and fifth program instructions 746, encoded in computer readable medium 741. Fourth program instructions 745 receive a revise signaling rate instruction from an interconnected processor, such as for example SES processor 614. In response to that revise signaling rate instruction, fifth program instructions 746 generates a plurality of revised device control code bits, and provides that plurality of revised device control code bits to each of the PFW modules disposed in the signaling speed module, wherein that plurality of revised device control code bits indicate a new signaling speed.

In the illustrated embodiment of FIG. 8A, edge 701 (FIG. 7A) of signaling speed module 700 is shown releaseably inserted into connector 660 such that communication link 736 (FIGS. 7A, 7B) is in communication with communication link 646 which is in communication with communication link 656, and such that communication link 734 (FIGS. 7A, 7B) is in communication with communication link 644 which is in communication with communication link 654, and such that communication link 732 (FIGS. 7A, 7B) is in communication with communication link 642 which is in communication with communication link 652. Communication links 820 and 830 interconnect memory device 710 and SES Processor 614. SES Processor 614 can read the pre-determined signaling rate encoded into memory device 710 and set all link rates in the system to that pre-determined signaling rate.

In the illustrated embodiment of FIG. 8B, edge 706 (FIG. 7B) of signaling speed module 705 is shown releaseably inserted into connector 660 such that communication link 736 (FIGS. 7A, 7B) is in communication with communication link 646 which is in communication with communication link 656, and such that communication link 734 (FIGS. 7A, 7B) is in communication with communication link 644 which is in communication with communication link 654, and such that communication link 732 (FIGS. 7A, 7B) is in communication with communication link 642 which is in communication with communication link 652. Communication links 820, 830, 840, and 850, interconnect SES Processor 614 and speed selection module 740. Using speed selection module 740, SES Processor 614 can independently select the signaling rate for each disk interconnected with midplane 570.

In both signaling speed module 700 and signaling speed module 705, PFW logic module 730 comprises control bits dev_ctl0, dev_ctl1, and dev_ctl2 for disk 0. Where Applicant's switch domain comprises (N) data storage devices, the (n)th PFW logic module comprises control bits dev_ctl0, dev_ctl1, and dev_ctl2, and provides those control bits to the (n)th data storage device, wherein (n) is greater than or equal to 0 and less than or equal to (N−1). In certain embodiments, (n) is greater than or equal to 0 and less than or equal to 15. The failure of one PFW logic module disposed on signaling speed module 700 will not disrupt the use of all data storage devices disposed in the switch domain. Rather, a failure of, for example, PFW logic module 3 will adversely impact only the operation of data storage device 3.

Under Section 6.4.8 of SFF Specification 8045 (hereinafter the "Specification"), directed to the operations of a Fibre Channel data storage device, signaling rates must be implemented using discrete, non-bused control signals wired to the disk drive connector pin out, such as connector 660. In certain embodiments, connector 660 comprises a Single Connector Assembly ("SCA"). In certain embodiments, SCA 660 comprises a 40 position SCA. Using Applicants' apparatus and method, signaling rates, i.e. storage device speed, are provided using three Device Control Code bits, namely dev_ctl0, dev_ctl1, and dev_ctl2.

Power supply 810 provides power failure warning signals to signaling speed modules 700 and 705 via power failure warning communication link 720. FIG. 9 defines various settings for Applicant's Device Control Code bits. In certain embodiments, Applicants' apparatus and method implement the optional Early Power Off Warning ("EPOW") function set forth in Section 6.4.8.2. of the Specification, entitled "Power Failure Warning."

In these embodiments, Applicants' apparatus and method utilize three Device Control Code bits, i.e. dev_ctl0, dev_ctl1, and dev_ctl2, to differentiate between an EPOW signal, a 1 Gb/s signaling rate, a 2 Gb/s signaling rate, a 4 Gb/s signaling rate, or an 8 Gb/s signaling rate. For example, Device Control Code bits "000" signal an imminent loss of power to a data storage device. Device Control Code bits "111" indicate use of a 1 Gb/second signaling rate. Device Control Code bits "110" indicate use of a 2 Gb/second signaling rate. Device Control Code bits "101" indicate use of a 4 Gb/second signaling rate. Device Control Code bits "100" indicate use of an 8 Gb/second signaling rate.

Figure 10A:
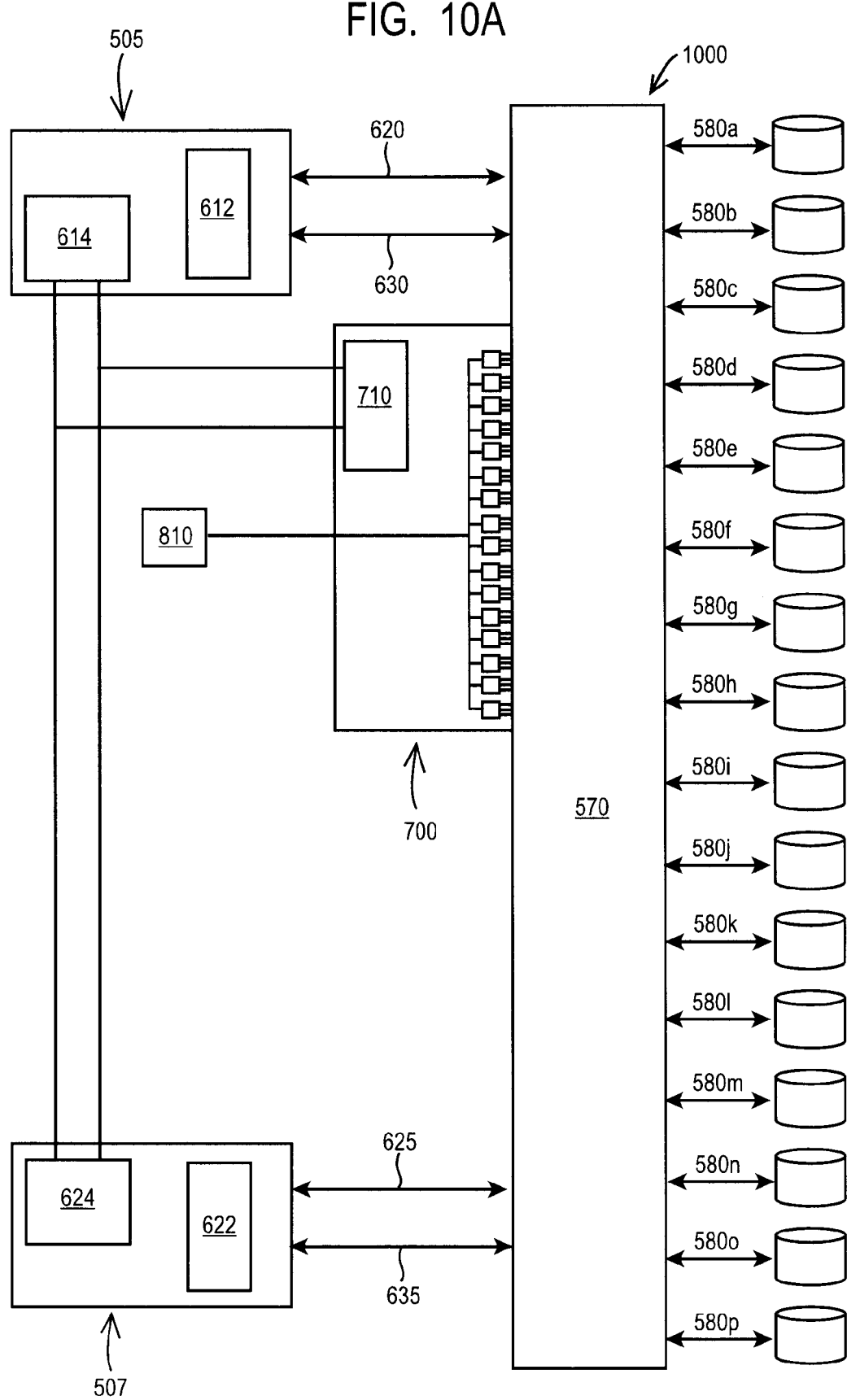
FIG. 10A is block diagram showing the a first switch domain comprising the signaling speed module of FIG. 7A.

FIG. 10A shows Applicant's switch domain 1000 comprising 16 data storage devices. A first switch domain controller 505 is interconnected with midplane 570 via a plurality of rate communication lines 620, and a plurality of disk present lines 630. A second switch domain controller 507 is interconnected with midplane 570 via a plurality of rate communication lines 625, and a plurality of disk present lines 635.

Signaling speed module 700 comprising 16 power failure logic modules is releaseably attached to, and in communication with, midplane 570, and in communication with first switch domain controller 505 and second switch domain controller 507. Each power failure module disposed in signaling speed module 700 comprises a set of control bits dev_ctl0, dev_ctl1, and dev_ctl2 for a different one of 16 data storage devices. In response to an imminent power failure, power supply 810 provides an EPOW signal to signaling speed module 700. The embodiment of FIG. 10A includes 16 storage devices by way of example, in other embodiments switch domain 1000 can comprise a wide range of different numbers of storage devices.

Figure 10B:
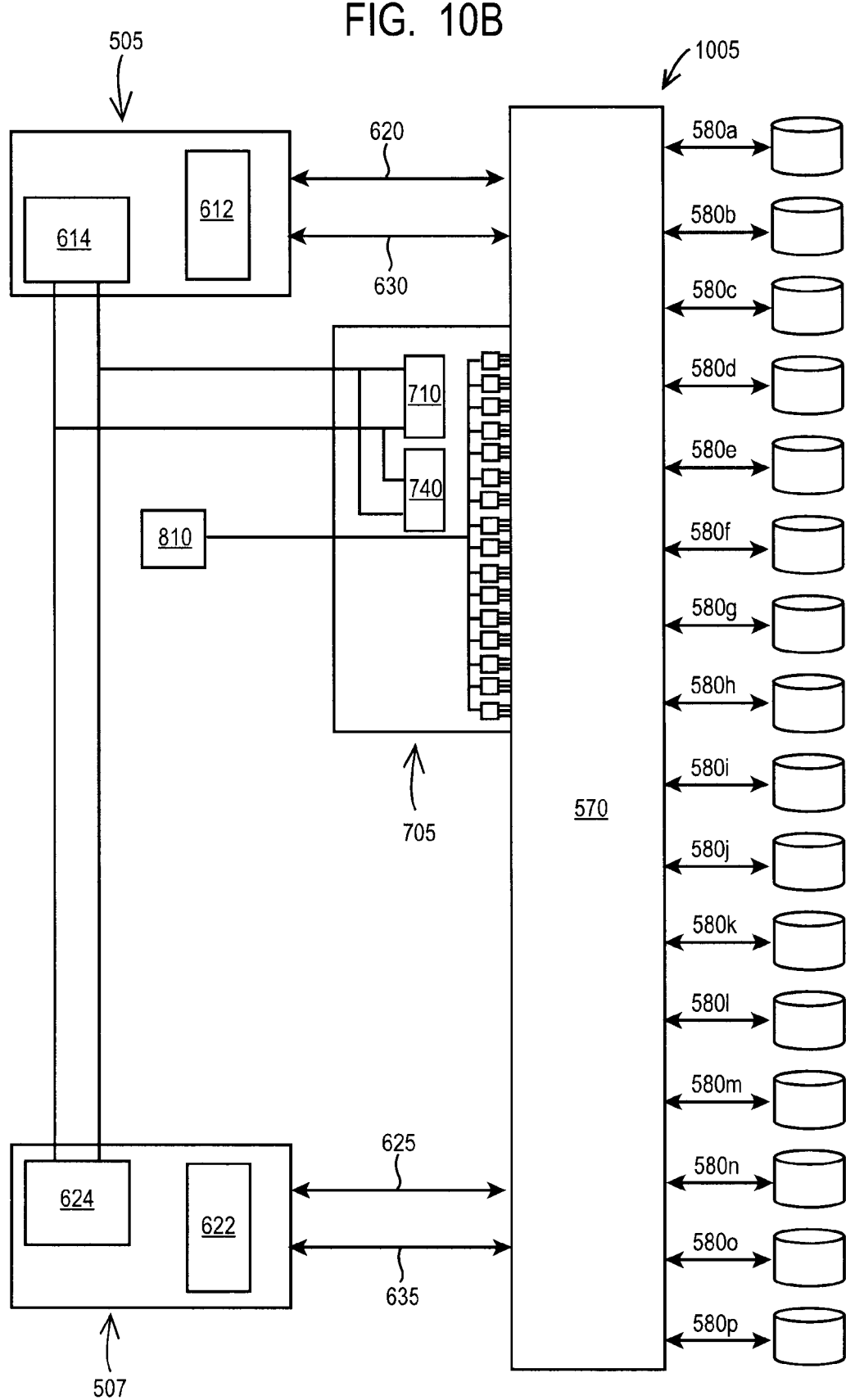
FIG. 10B is block diagram showing the a first switch domain comprising the signaling speed module of FIG. 7B.

FIG. 10B shows Applicant's switch domain 1005 comprising 16 data storage devices. A first switch domain controller 505 is interconnected with midplane 570 via a plurality of rate communication lines 620, and a plurality of disk present lines 630. A second switch domain controller 507 is interconnected with midplane 570 via a plurality of rate communication lines 625, and a plurality of disk present lines 635.

Signaling speed module 705 comprising speed selection module 740 in communication with 16 power failure modules is releaseably attached to, and in communication with, midplane 570, and in communication with first switch domain controller 505 and second switch domain controller 507. Each power failure module disposed in signaling speed module 700 comprises a set of control bits dev_ctl0, dev_ctl1, and dev_ctl2 for a different one of 16 data storage devices. Power supply 810 provides power failure warning signals to signaling speed module 700. The embodiment of FIG. 10B includes 16 storage devices by way of example, in other embodiments switch domain 1000 can comprise a wide range of different numbers of storage devices.

The present invention is not limited to any specific frequencies. By way of example and not limitation, frequencies which the present invention can be used to set include 1, 2, 4 or 8 GHz.

While the preferred embodiments of the present invention have been illustrated in detail, it should be apparent that modifications and adaptations to those embodiments may occur to one skilled in the art without departing from the scope of the present invention as set forth in the following claims.

I claim:

1. A signaling speed module for setting the signaling rate for (N) data storage devices, comprising:
    an EEPROM memory device encoded with a pre-determined signaling rate;
    (N) power failure warning logic modules;
    wherein the (n)th power failure warning logic module comprises a plurality of device control code bits for the (n)th data storage device, wherein said plurality of device control code bits indicate the signaling rate for the (n)th data storage device, and wherein (n) is greater than or equal to 0 and less than or equal to (N−1);
    wherein:
    device control code bits "111" indicate use of a 1 Gb/second signaling rate;
    device control code bits "110" indicate use of a 2 Gb/second signaling rate;
    device control code bits "101" indicate use of a 4 Gb/second signaling rate;
    device control code bits "100" indicate use of an 8 Gb/second signaling rate.

2. The signaling speed module of claim 1, further comprising a power failure warning communication link in communication with each of said (N) power failure warning logic modules.

3. The signaling speed module of claim 1, wherein device control code bits "000" indicate an imminent power failure.

4. The signaling speed module of claim 1, further comprising a memory device, wherein said memory device is encoded with a pre-determined signaling rate for said (N) data storage devices.

5. The signaling speed module of claim 1, further comprising a speed selection module in communication with each of said (N) power failure warning logic modules, wherein said speed selection module sets the signaling rate for each of said (N) data storage devices.

6. The signaling speed module of claim 5, further comprising:
    (N) speed selection communication links;
    wherein said speed selection module communicates with the (i)th power failure warning logic module using the (i)th speed selection communication link, wherein (i) is greater than or equal to 0 and less than or equal to (N−1).

7. A data storage and retrieval system, comprising:
    a midplane;
    (N) data storage devices interconnected with said midplane;
    a signaling speed module releaseably attached to said midplane, wherein said signaling speed module comprises an EEPROM memory device encoded with a pre-determined signaling rate and (N) power failure warning logic modules, wherein the (n)th power failure warning logic module is in communication with the (n)th data storage device, and wherein the (n)th power failure warning logic module comprises the (n)th plurality of control bits, wherein said (n)th plurality of control bits indicate the signaling rate for the (n)th data storage device, and wherein (n) is greater than or equal to 0 and less than or equal to (N−1);
    wherein:
    device control code bits "111" indicate use of a 1 Gb/second signaling rate;
    device control code bits "110" indicate use of a 2 Gb/second signaling rate;
    device control code bits "101" indicate use of a 4 Gb/second signaling rate;
    device control code bits "100" indicate use of an 8 Gb/second signaling rate.

8. The data storage and retrieval system of claim 7, further comprising:
    a power supply;
    wherein said signaling speed module further comprises a power failure warning communication link interconnecting each of said (N) power failure warning logic modules with said power supply.

9. The data storage and retrieval system of claim 8, wherein device control code bits "000" indicate an imminent power failure.

10. The data storage and retrieval system of claim 7, wherein said signaling speed module further comprises a memory device, wherein said memory device is encoded with a pre-determined signaling rate for said (N) data storage devices.

11. The data storage and retrieval system of claim 7, further comprising:
a controller interconnected with said midplane;
wherein said signaling speed module further comprises a speed selection module in communication with said controller and with each of said (N) power failure warning logic modules, wherein said speed selection module sets the signaling rate for each of said (N) data storage devices.

12. The data storage and retrieval system of claim 11, wherein said signaling speed module further comprises:
(N) speed selection communication links;
wherein said speed selection module communicates with the (i)th power failure warning logic module using the (i)th speed selection communication link, wherein (i) is greater than or equal to 0 and less than or equal to (N−1).

13. A non-transitory computer readable medium encoding a computer program product for setting the signaling speed of (N) data storage devices, comprising:
first program instructions to generate a plurality of device control code bits for each of (N) data storage devices, wherein the (n)th plurality of device control code bits set the signaling rate for the (n)th data storage device, and wherein (n) is greater than or equal to 0 and less than or equal to (N−1);
wherein:
said first program instructions are encoded in a non-transitory computer readable medium;
said first program instructions set said plurality of device control code bits to "111" to indicate use of a 1 Gb/second signaling rate;
said first program instructions set said plurality of device control code bits to "110" to indicate use of a 2 Gb/second signaling rate;
said first program instructions set said plurality of device control code bits to "101" to indicate use of a 4 Gb/second signaling rate;
said first program instructions set said plurality of device control code bits to "100" to indicate use of an 8 Gb/second signaling rate.

14. The non-transitory computer readable medium of claim 13, further comprising:
second program instructions to receive an Early Power Off Warning signal, wherein said power supply provides power to each of said (N) data storage devices;
third program instructions responsive to said Early Power Off Warning signal, to generate a plurality of revised device control code bits for each of said (N) data storage devices, wherein the (n)th plurality of revised device control code bits indicate to the (n)th data storage device an imminent power failure;
wherein said second program instructions and said third program instructions are encoded in said computer readable medium.

15. The non-transitory computer readable medium of claim 14, wherein said third program instructions set said plurality of revised device control code bits to "000" to indicate an imminent power failure.

16. The non-transitory computer readable medium of claim 14, further comprising:
fourth program instructions to receive a revise signaling rate instruction;
fifth program instructions responsive to said revise signaling rate instruction to generate revised device control code bits to change the signaling rate for one or more of said (N) data storage devices.

17. The non-transitory computer readable medium of claim 16, wherein:
said computer program product is disposed in a signaling speed module releaseably disposed in a data storage and retrieval system;
said data storage and retrieval system further comprises a controller interconnected to said signaling speed module;
said controller provides said revise signaling rate instruction.

* * * * *